United States Patent [19]

Song

[11] Patent Number: 5,561,648

[45] Date of Patent: Oct. 1, 1996

[54] OPTICAL PICKUP ACTUATOR FOR AN OPTICAL DISC PLAYER HAVING A PLURALITY OF TRACKING COILS

[75] Inventor: Ki-Seog Song, Seoul, Rep. of Korea

[73] Assignee: Daewoo Electronics Co., Ltd., Seoul, Rep. of Korea

[21] Appl. No.: 348,810

[22] Filed: Nov. 28, 1994

[30] Foreign Application Priority Data

Nov. 29, 1993 [KR] Rep. of Korea ............... 93-25623

[51] Int. Cl.$^6$ .................................................. G11B 7/09
[52] U.S. Cl. .................... 369/44.15; 369/44.16; 359/813
[58] Field of Search .................... 369/44.14, 44.15, 369/44.16, 44.21, 44.22; 359/813, 814, 824, 823

[56] References Cited

U.S. PATENT DOCUMENTS

| | | | |
|---|---|---|---|
| 4,643,522 | 2/1987 | Takashima | 369/44.15 |
| 4,887,888 | 12/1989 | Nose | 369/44.17 |
| 5,144,607 | 9/1992 | Ishida et al. | 369/44.15 |

FOREIGN PATENT DOCUMENTS 0164233  7/1987  Japan ...................... 369/44.15

*Primary Examiner*—Aristotelis Psitos
*Assistant Examiner*—Thang V. Tran
*Attorney, Agent, or Firm*—Oliff & Berridge

[57] ABSTRACT

An optical pickup actuator having a small size with a simple structure without crosstalks when playing back is disclosed. The optical pickup actuator includes an object lens holder having an object lens and for performing a focusing operation moving upwards and downwards and for performing a tracking operation moving frontwards and rearwards, a base plate having a hole at the center thereof for passing a laser beam generated by a laser diode, and a pair of flat plates for supporting an object lens holder and for allowing object lens holder to move upwards, downwards, frontwards and rearwards. A crosstalk phenomenon which is caused by an interference of reproduction signals can be suppressed during the tracking and focusing operations.

7 Claims, 5 Drawing Sheets

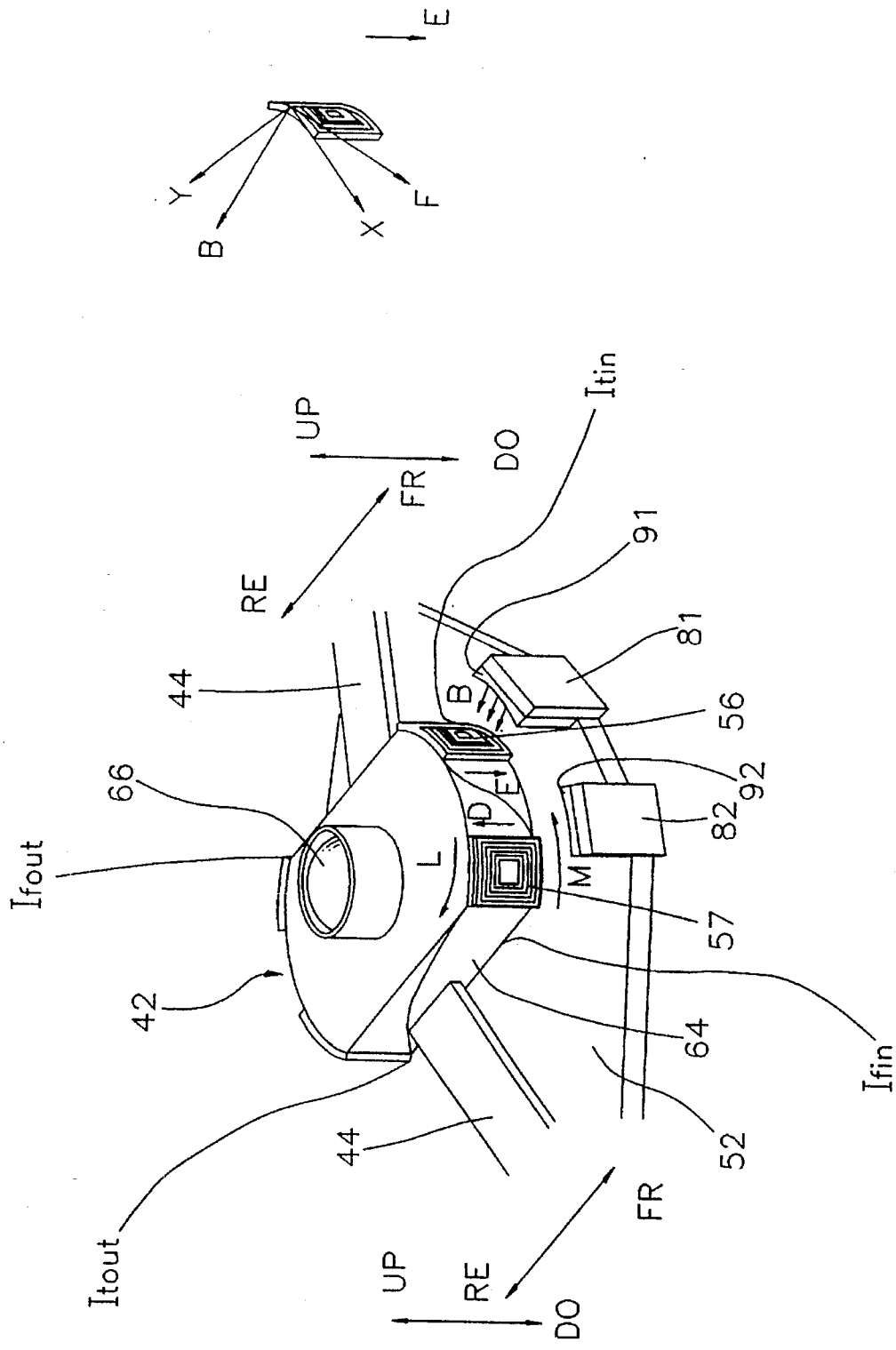

OPTICAL PICKUP ACTUATOR FOR AN OPTICAL DISC PLAYER HAVING A PLURALITY OF TRACKING COILS

BACKGROUND OF THE INVENTION

1. Field of the Invention

The present invention relates to an optical disc player, more particularly to an optical pickup actuator for an optical disc player.

2. Description of the Prior Art

Generally, in various optical disc players such as a mini-disc player, a compact disc player, a laser disc player and a multi-disc player accommodating various discs, an optical pickup device, which is installed directly below an optical recording medium such as an optical disc, performs a track seeking operation moving straight in the radial direction over the disc for seeking a desired track. When the optical pickup device seeks the desired track by the track seeking operation, the optical pickup device performs a track following operation which follows the desired track. In the track following operation, an object lens of the optical pickup device focuses a laser beam on the track which is being followed. When the laser beam is not accurately focused on the track or when a focus of the laser beam is slightly deviated from the track, an optical pickup actuator installed in an optical pickup device performs a focusing operation and a tracking operation. By the focusing and tracking operations of the actuator, the object lens accurately forms a focus of the laser beam on the track while following the track.

U.S. Pat. No. 5,144,607 (granted to Tomoyuki Ishida et al.) discloses a structure of a conventional optical actuator.

FIG. 1 illustrates the conventional optical actuator of an optical pickup device disclosed in the above U.S. patent.

As shown in FIG. 1, the conventional optical pickup actuator includes an object lens bobbin 1 provided with an object lens 2; an object lens supporting member 3 for movably supporting object lens bobbin 1 in focusing and tracking operation directions; focusing coils 6 and tracking coils 7 inserted within object lens bobbin 1; and a magnetic yoke 4 for driving object lens 2 in the focusing and tracking operation directions by forming magnetic flux toward focusing coils 6 and tracking coils 7.

In the above conventional optical pickup actuator, focusing coils 6 and tracking coils 7 are inserted in a coil housing 12 of object lens bobbin 1. Object lens supporting member 3 includes a pair of suspension plates 16; a pair of connecting plates 15 connected to each end of suspension plates 16; and a supporting member 21 inserted between suspension plates 16, thereby forming a rectangular frame.

Further, magnetic yoke 4 includes a bottom plate 220, first and second side plates 221 and 222, a connecting plate 223, and first and second lugs 221a and 222a, thereby forming a rectangular frame.

In the optical pickup actuator having the above structure, since assembled structures have to be provided on both sides of the object lens bobbin, the structure of the optical pickup device becomes complicated, and the overall height and length of the optical pickup actuator are increased.

Further, since the optical pickup actuator includes thin metal plates which are used for increasing the vibration damping efficiency of the suspension plates, its fabrication is difficult and its workability is lowered.

Further, a crosstalk phenomenon is intensified during a signal reproduction since oscillations occur in a focusing direction during a tracking operation as well as in a tracking direction during a focusing operation.

SUMMARY OF THE INVENTION

Therefore, it is an object of the present invention to provide an optical pickup actuator for an optical disc player having a small size with a simple structure.

It is another object of the present invention to provide an optical pickup actuator for an optical disc player without crosstalks during playback.

In achieving the above objects, an optical pickup actuator for an optical disc player according to the present invention comprises:

an object lens holder having an object lens and for performing a focusing operation moving upwards and downwards and for performing a tracking operation moving frontwards and rearwards, the object lens holder being formed with an upper plate provided at a center thereof with a hole for the object lens and a peripheral wall extended downwards from a periphery of the upper plate, having a focusing coil wound around the peripheral wall for the focusing operation and a plurality of tracking coils each having a rectangular shape and being attached with a gap therebetween on a front and a rear sides of the focusing coil, and having lateral slits each formed at a center of a left and a right sides of the peripheral wall;

a base plate having a hole at a center thereof for passing a laser beam through, facing grooves at a left and a right ends thereof each formed by a cover integrated therewith and formed with side walls opposite to each other, a rear wall and an upper base, and having yokes on a front and a rear sides thereof corresponding with the tracking coils wherein a magnet is attached to each of the yokes; and a pair of flat plates connecting the object lens holder and the base plate and for elastically supporting and moving the object lens holder upwards, downwards, frontwards and rearwards.

In the optical pickup actuator for an optical disc player which has the above structure according to the present invention, since the focusing coil and the tracking coils are disposed within a magnetic field, the actuator performs a tracking operation which moves the object lens holder frontwards and rearwards in accordance with the current flow directions in the tracking coils and performs a focusing operation which moves the object lens holder upwards and downwards in accordance with a current flow direction in the focusing coil. Through the tracking operation and the focusing operation, the optical pickup actuator accurately follows a desired track while precisely focusing a laser beam on the track, so that recording and reproducing to and from an optical disc can be accurately carried out.

The flat plates of the optical pickup actuator move frontwards and rearwards or are elastically deflected upwards and downwards, so that the optical pickup actuator performs the tracking and focusing operations in a separate manner. Therefore, during a reproduction of the optical pickup actuator from an optical disc through the two operations, i.e., through the tracking operation and the focusing operation, a crosstalk phenomenon due to the interference between the reproduction signals can be avoided. Further, an overall height is reduced owing to the simple structure of the optical pickup actuator.

BRIEF DESCRIPTION OF THE DRAWINGS

The above object and other advantages of the present invention will become more apparent by describing in detail the preferred embodiment of the present invention with reference to the attached drawings in which.

DESCRIPTION OF THE PREFERRED EMBODIMENT

A description will be given below in detail to the structure and operations of an optical pickup actuator for an optical disc player according to an embodiment of the present invention with reference to the accompanying drawings.

Figure 1:
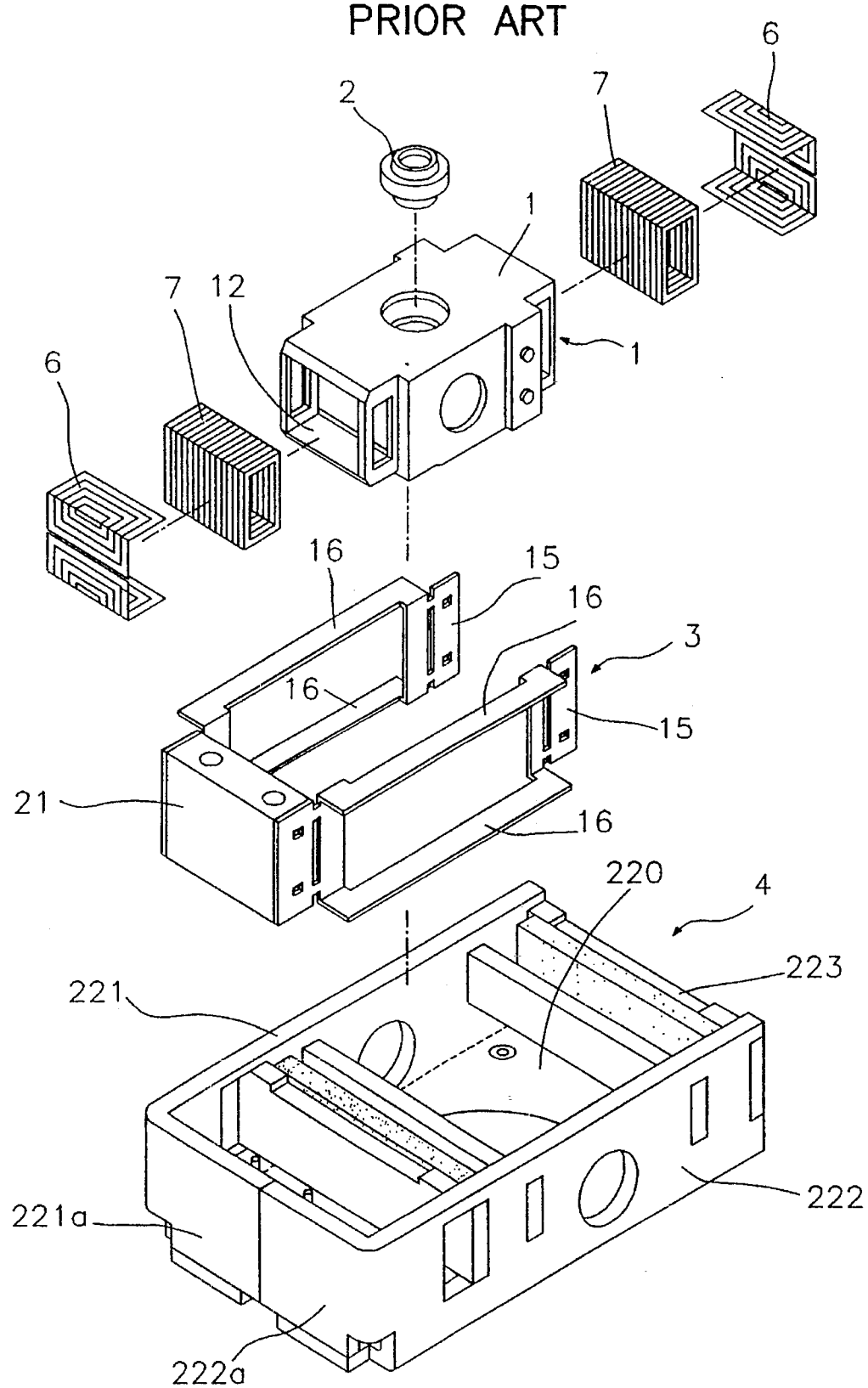
FIG. 1 is an exploded perspective view showing a structure of a conventional optical pickup actuator for an optical disc player.
Figure 2:
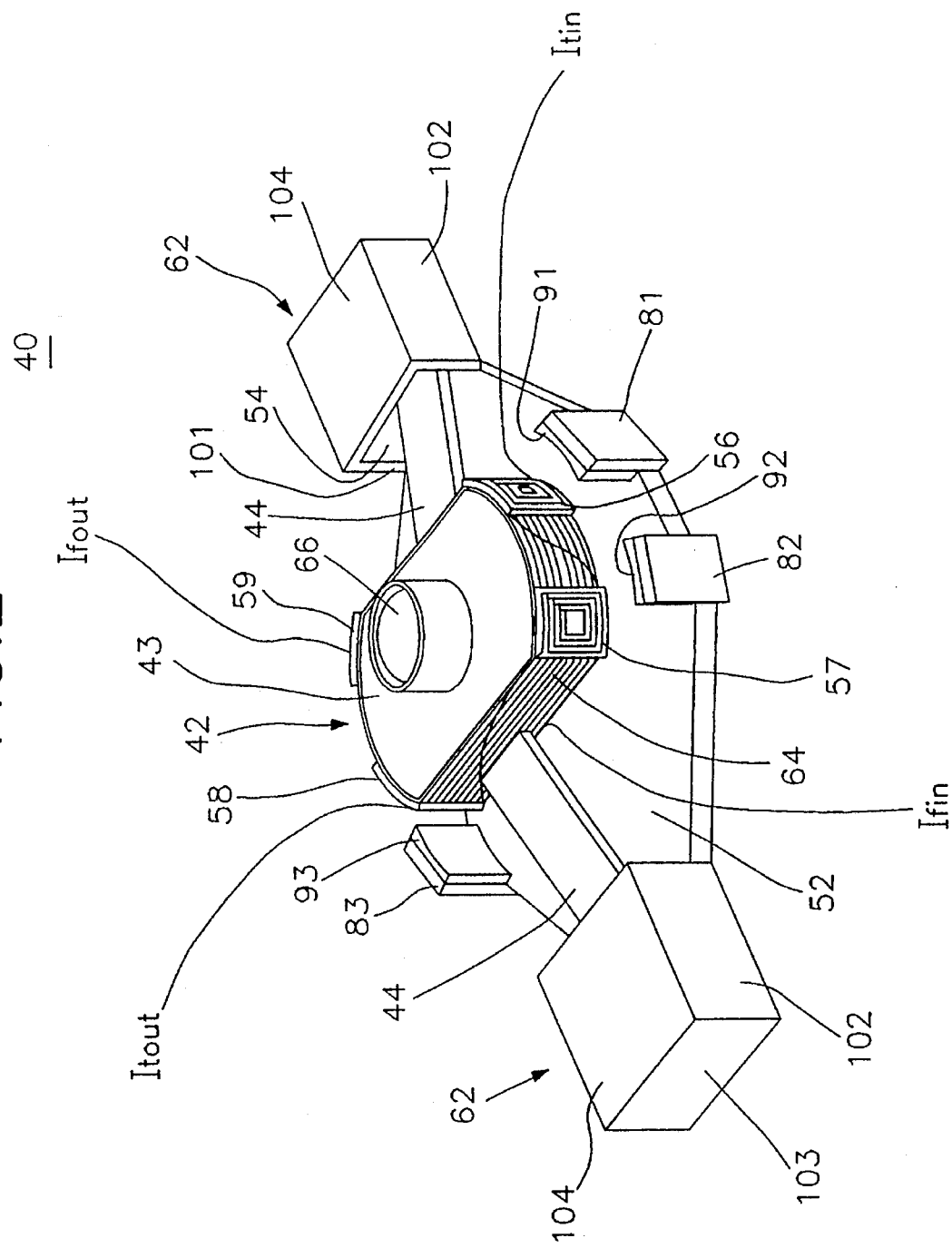
FIG. 2 is a perspective view showing a structure of an optical pickup actuator according to an embodiment of the present invention.
Figure 3:
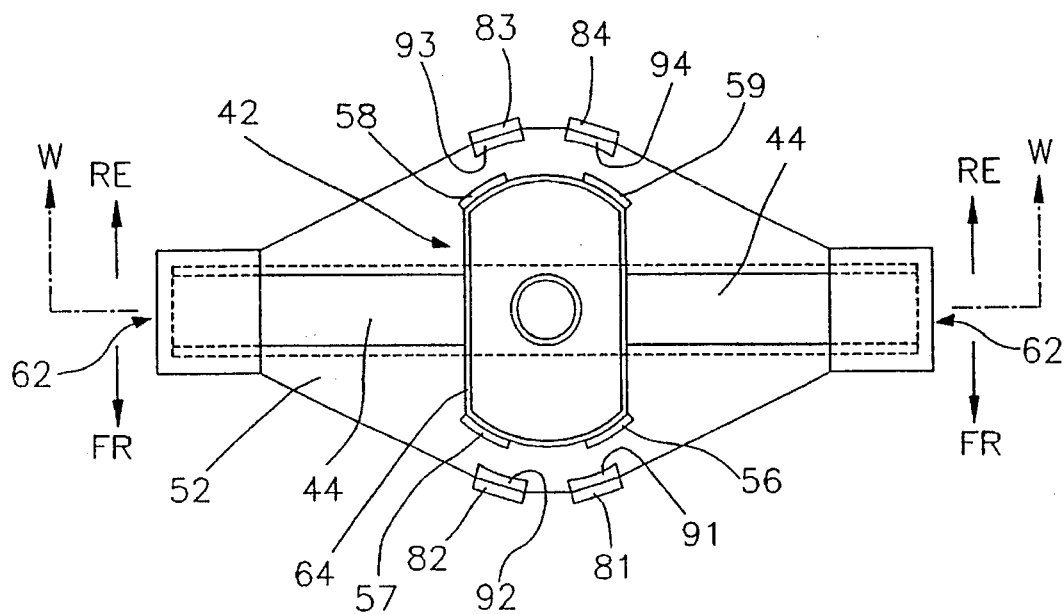
FIG. 3 is a plan view for explaining a tracking operation of an optical pickup actuator for an optical disc player as shown in FIG. 2.
Figure 4:
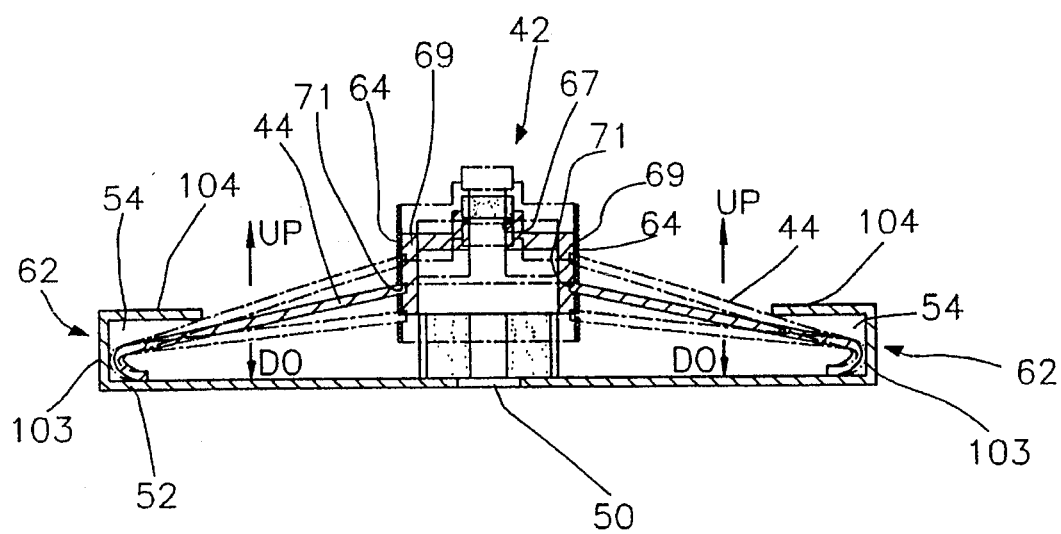
FIG. 4 is a cross-sectional view taken along a line W—W of FIG. 3 for explaining a focusing operation of an optical pickup actuator for an optical disc player as shown in FIG. 2.

FIG. 2 is a perspective view showing a construction of an optical pickup actuator according to an embodiment of the present invention, FIG. 3 is a plan view for explaining a tracking operation of an optical pickup actuator for an optical disc player as shown in FIG. 2, and FIG. 4 is a cross-sectional view taken along a line W—W of FIG. 3 for explaining a focusing operation of an optical pickup actuator for an optical disc player as shown in FIG. 2. As shown in FIGS. 2 to 4, an optical pickup actuator 40 for an optical disc player according to an embodiment of the present invention comprises an object lens holder 42 having an object lens 66 and for performing a focusing operation moving upwards and downwards (arrows UP and DO) and for performing a tracking operation moving frontwards and rearwards (arrows FR and RE), a base plate 52 having a hole 50 at the center thereof for passing a laser beam generated by a laser diode (not shown), and a pair of flat plates 44 for supporting an object lens holder 42 and for allowing object lens holder 42 to move upwards (arrow UP), downwards (arrow DO), frontwards (arrow FR) and rearwards (arrow RE).

Further, object lens holder 42 is formed with an upper plate 43 having an opening 67 at the center thereof for mounting an object lens 66 and an peripheral wall 69 which extends downward along the periphery of upper plate 43.

A focusing coil 64 for performing the focusing operation is formed by being wound around peripheral wall 69. A tracking coil for performing the tracking operation is formed by being wound into a rectangular shape. A plurality of tracking coils each formed in a rectangular shape as mentioned above, for example 4 tracking coils 56, 57, 58 and 59 as shown in FIG. 2, are attached on focusing coil 64.

According to the embodiment of the present invention, two tracking coils 56 and 57 are fixedly attached on the front portion of focusing coil 64 with a gap therebetween, while other two tracking coils 58 and 59 are fixedly attached on the rear portion of focusing coil 64 in the same distance as that of tracking coils 56 and 57, on the correspondingly opposite to each other. A longitudinal slit is formed on each of the center portions of the left and right peripheral walls 69 of object lens holder 42.

A cover 62 in one body with base plate 52 is formed on each end of the right and left sides of base plate 52 in order to form grooves 54 facing to each other.

Cover 62 is formed with a pair of oppositely facing side walls 101 and 102, a rear wall 103, and an upper base 104. On the front and rear sides of base plate 52, there are formed yokes 81, 82, 83 and 84 each integrated with base plate 52, in such a manner that they respectively face toward tracking coils 56, 57, 58 and 59. Permanent magnets 91, 92, 93 and 94 are respectively disposed between yokes 81, 82, 83 and 84 and tracking coils 56, 57, 58 and 59, as shown in FIG. 2. Permanent magnets 91, 92, 93 and 94 have a proper size, and are fixedly attached to yokes 81, 82, 83 and 84 respectively. Respective permanent magnets 91, 92, 93 and 94 are positioned in such a manner that their N poles face toward the tracking coils 56, 57, 58 and 59.

Each of flat plates 44 have a short width and a long length and a predetermined ratio of its width with respect to its thickness, for example a 10:1 ratio. A proper rigidity with a proper elasticity can be obtained by defining the ratio of the width with respect to the thickness. When flat plates 44 are too rigid, a control of displacements thereof becomes difficult and much power is consumed since a high current should flow in the tracking and focusing coils. On the other hand, when flat plates 44 are so flexible, they become very sensitive to external disturbances so that the accurate tracking and focusing operations can not be performed.

One end of each of flat plates 44 is inserted in each of slit grooves 71 which are formed on the left and right sides of peripheral wall 69 of object lens holder 42. The other end of each of flat plates 44 is curved in a round shape and is inserted into each of grooves 54 which are formed on the left and right sides of the base plate 52. The width of each of grooves 54 is larger than that of each of flat plates 44, so that the end portions of flat plates 44 can slide within grooves 54. An upper limit of an upward movement of each of flat plates 44 is defined by the bottom of upper base 104 of cover 62, while a lower limit of a downward movement of each of flat plates 44 is defined by rear wall 103 of cover 62.

Figure 5:
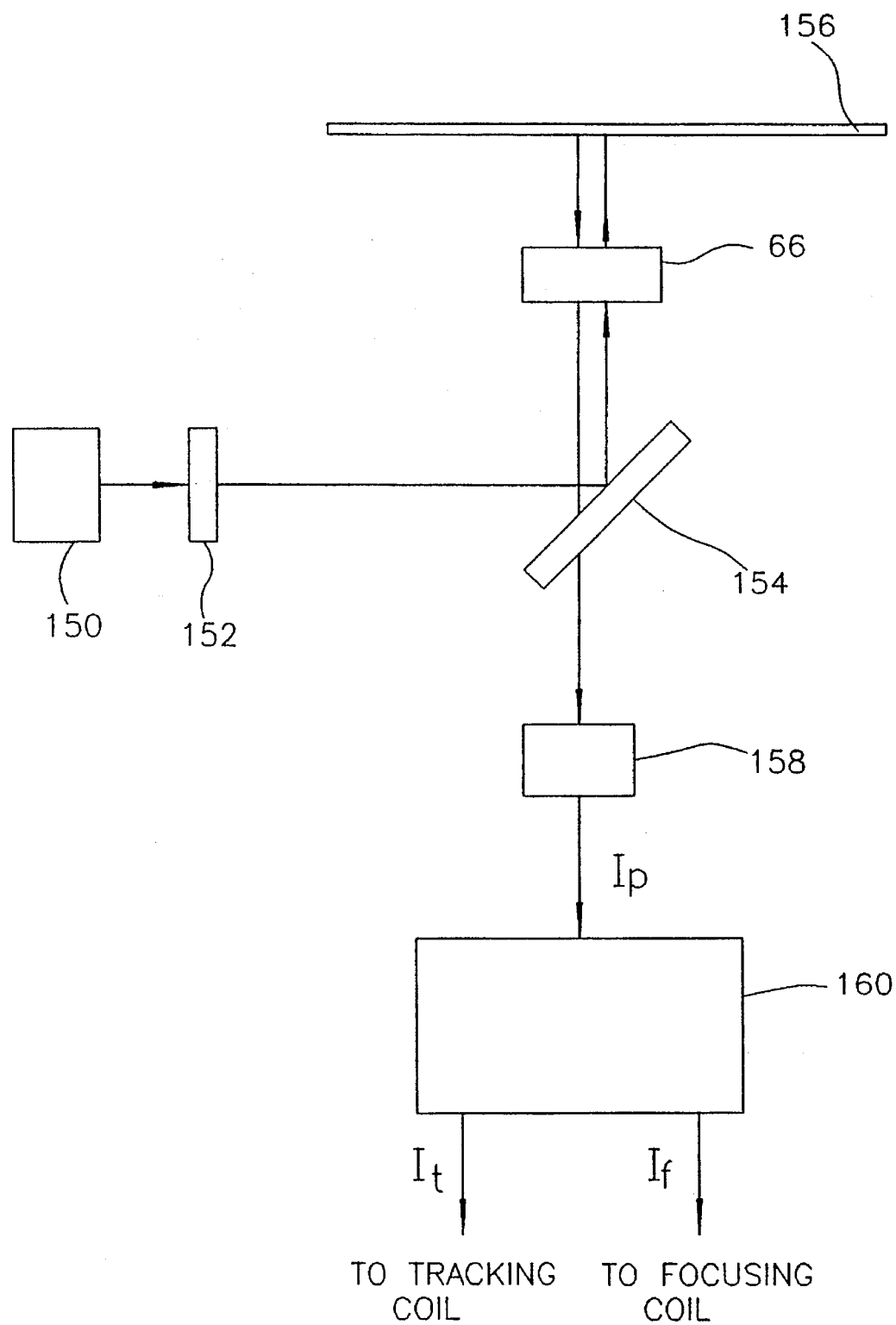
FIG. 5 is a simplified block diagram of a servo system for supplying control currents for tracking and focusing operations of an optical pickup actuator for an optical pickup player as shown in FIG. 2; and PIG. 6 is a view for explaining force directions formed due to a magnetic field and currents flowing in tracking and focusing coils of an optical pickup actuator for an optical disc player as shown in FIG. 2.

FIG. 5 is a simplified block diagram of a servo system for supplying control currents for tracking and focusing operations of an optical pickup actuator for an optical pickup player as shown in FIG. 2. As shown in FIG. 5, a laser beam which is emitted from a laser diode 150 travels through a grating lens 152 to a half mirror 154. The laser beam which has arrived at half mirror 154 passes through hole 50 of the base plate 52 and object lens 66 of object lens holder 42 to reach an optical disc 156.

The laser beam which is irradiated on optical disc 156 is reflected to half mirror 154 through object lens 66 and hole 50. A part of the reflected laser beam passes through half mirror 154 to a photo diode 158.

Photo diode 158 generates an electrical signal $I_p$ in accordance with the irradiated laser beam. The generated electrical signal $I_p$ is inputted into an optical pickup actuator servo system 160, which then outputs tracking and focusing control currents $I_t$ and $I_f$ to tracking coil 56 and to focusing coil 64 so as to correct tracking and focusing errors. As shown in FIGS. 2 and 3, tracking and focusing control currents $I_t$ and $I_f$ are inputted into an input terminal $I_{tin}$ of tracking coil 56 and into an input terminal $I_{fin}$ in the focusing coil 64 and outputted through output terminals $I_{tout}$ and $I_{fout}$.

FIG. 6 is a view for explaining force directions formed due to a magnetic field and currents flowing in tracking and focusing coils of an optical pickup actuator for an optical disc player in FIG. 2.

Since the N pole of each of permanent magnets 91, 92, 93 and 94 is facing toward tracking coils 56, 57, 58 and 59 and focusing coil 64 all the time, as mentioned above, a direction of the magnetic field S is directed toward coils 56, 57, 58, 59 and 64.

As shown in FIG. 6, when a current flows in focusing coil 64 in the L direction, a force is generated downwards according to Fleming's left hand law ($F=I \times B$). Accordingly, object lens holder 42 moves downwards, i.e., in the direction of arrow DO. This force is formed between the focusing coil 64 and the flux B in the came direction, so that the object lens holder 42 would move downward.

On the other hand, when a current flows in the focusing coil 64 in the M direction, the force is generated in the upward direction according to the same law ($F=I \times B$). Accordingly, object lens holder 42 moves upwards, i.e., in the direction of arrow UP.

In the case where a current flows through first tracking coil 57 in the D direction and a current flows through second tracking coil 56 in the E direction, the forces are generated in the right and left tangential directions of tracking coils 56 and 57 according to Fleming's left hand law. Since the portions where the tracking coils 56 and 57 are installed have certain curvatures, the generated force can be separated into an X component and a Y component (the force of the X direction is perpendicular to the tracking direction, and the force of the Y direction is parallel with the tracking direction).

The forces of the X components act in the mutually opposite directions so as to be offset from each other. Therefore, only the Y components of the forces substantially remain. Consequently, object lens holder 42 is pushed rearwards, i.e., in the direction of arrow RE.

When a current flows in tracking coils 58 and 59 which are mounted on the opposite portions to tracking coils 56 and 57, forces which can be separated into X components and Y components are generated in the directions tangential to left and right tracking coils 58 and 59. In the same way mentioned before, the forces of the X components are offset from each other, and therefore, only the forces of the Y components remain, so that object lens holder 42 is pulled rearwards. If currents flow in the opposite direction through the two tracking coils 56 and 57, the forces of the X components are offset from each other, and only the forces of the Y components remain to act, so that object lens holder 42 is pulled frontwards, i.e., in the direction of arrow FR. The directions of the forces, X components and Y components of the forces are completely reverse to those described just before.

According to the present invention as described above, the flat plates of an optical pickup actuator moves rearwards and frontwards or are deflected upwards and downwards, so that the optical pickup actuator is able to perform tracking and focusing operations in a separate manner. Therefore, there can be eliminated a crosstalk phenomenon which is caused by an interference of the reproduction signals when performing two operations, i.e., the tracking and focusing operations of the optical pickup actuator.

In the above, the present invention was described based on the preferred embodiment of the present invention, but it should be apparent to those ordinarily skilled in the art that various modifications and changes can be added without departing from the scope of the present invention which is limited only by the appended claims.

What is claimed is:

1. An optical pickup actuator for an optical disc player, comprising:

an object lens holder having an object lens and for performing a focusing operation moving upwards and downwards and for performing a tracking operation moving frontwards and rearwards, said object lens holder having an upper plate provided at a center thereof with a hole for the object lens and a peripheral wall extended downwards from a periphery of the upper plate, having a focusing coil wound around the peripheral wall for the focusing operation and a plurality of tracking coils each having a rectangular shape and attached on the focusing coil with a distance on front and rear sides, and having lateral slits each formed at the center of left and right sides of the peripheral wall;

a base plate having a hole at the center thereof for passing a laser beam through, facing grooves at a left and a right ends thereof each integrally formed by a cover having side walls and opposite to each other, a rear wall and an upper base, and having yokes on a front and a rear sides thereof corresponding with the tracking coils wherein a magnet is attached to each of the yokes; and a pair of flat plates connecting the object lens holder and the base plate and for elastically supporting and moving the object lens holder upwards, downwards, frontwards and rearwards.

2. The optical pickup actuator as claimed in claim 1, wherein said pair of flat plates respectively have a width thereof shorter than a length thereof, and a ratio of the width with respect to the thickness is 10:1.

3. The optical pickup actuator as claimed in claim 2, wherein one end of each of said flat plates is curved in a round shape.

4. The optical pickup actuator as claimed in claim 2, wherein a width of each of said grooves formed by said cover is larger than said width of each of said flat plates, so that said flat plates can respectively slide within said grooves frontwards and rearwards.

5. The optical pickup actuator as claimed in claim 4, wherein a upper limit of the upward movement of each of said flat plates is defined by said upper base of said cover, and a lower limit of a downward movement of each of said flat plates is defined by said rear wall of said cover.

6. The optical pickup actuator as claimed in claim 1, wherein front and rear portions of said object lens holder has a curvature.

7. The optical pickup actuator as claimed in claim 6, wherein the surface of each of said permanent magnets has the, same curvature as that of each of said front and rear portions of said object lens holder.

* * * * *